Dec. 25, 1956         B. M. OLIVER         2,775,740
DIRECTIONAL COUPLING SYSTEMS
Filed Nov. 2, 1950         5 Sheets-Sheet 1

INVENTOR
B. M. OLIVER
BY Hugh S. Wertz
ATTORNEY

Dec. 25, 1956  B. M. OLIVER  2,775,740
DIRECTIONAL COUPLING SYSTEMS
Filed Nov. 2, 1950  5 Sheets-Sheet 2

INVENTOR
B. M. OLIVER
BY Hugh S. Wertz
ATTORNEY

FIG. 8A $$k\beta\ell = (2n-1)\frac{\pi}{2}$$

FIG. 8B

$$k\beta\ell = n\pi$$

INVENTOR
B. M. OLIVER
BY
ATTORNEY

Dec. 25, 1956  B. M. OLIVER  2,775,740
DIRECTIONAL COUPLING SYSTEMS
Filed Nov. 2, 1950  5 Sheets-Sheet 4

INVENTOR
B. M. OLIVER
BY
ATTORNEY

United States Patent Office 2,775,740
Patented Dec. 25, 1956

2,775,740

DIRECTIONAL COUPLING SYSTEMS

Bernard M. Oliver, Morristown, N. J., assignor to Bell Telephone Laboratories, Incorporated, New York, N. Y., a corporation of New York Application November 2, 1950, Serial No. 193,610

12 Claims. (Cl. 333—10)

This invention relates to electrical coupling systems and more particularly to transmission line directional couplers.

Directional couplers are known in the electrical transmission art as a means for extracting into a branch or auxiliary path considerable energy from a wave traveling in a given direction in a main transmission line or waveguide, but no energy, or very little, from a wave traveling therein in the opposite or "reverse" direction. Such devices are described as having a low forward loss and high backward loss. From reciprocity considerations, it can be seen that such devices, when excited in the branch path, can be made to deliver to the main line no energy or very little in the given forward direction, but, instead, substantially all the energy induced in the main line will be directed in the reverse direction. The ratio of the backward-to-forward loss is designated the directivity coefficient of the coupling.

In most previously developed directional couplers, this directivity coefficient varies appreciably with frequency so that high directivity is possible only within a relatively narrow bandwidth. However, in broadband communication systems, it is useful that the bandwidth within which good directivity is obtained be greater than that possible in these previously developed coupling systems. In addition, it is also desirable to provide more uniform coupling within this band.

Accordingly, one object of the present invention is to provide more suitable directional coupling systems for broadband operation, and moreover, to improve the uniformity of coupling within this band.

Directional couplers can be classified into two (or three) types according to how the directional property arises. In one basic type, the coupling at any point is bidirectional, but in one direction the elementary induced waves cancel by destructive interference while in the other direction they add. This can be termed an interference-type directional coupler. In the other basic type, the coupling at any point is inherently directional, and no interference between waves from separate coupling points is necessary for directional characteristics. This can be termed an intrinsic-type directional coupler. Additionally, an arrangement is possible which utilizes both inherently directional coupling as well as interferences cancellation. This can be termed a composite-type directional coupler. The essential operational difference between an intrinsic-type and an interference-type directional coupler is that the former has ideally no backward transmission at any frequency while this is not possible with the latter.

Hitherto, the interest in directional couplers has been primarily in wave guide or coaxial structures operating in the microwave region. The present invention relates primarily to parallel transmission line couplers which are useful in the lower radio frequency spectrum, as for example, the region of operation of home television receivers. For reasons of generality, there will be discussed primarily coupled balanced (two wire) transmission lines rather than single wire-to-ground unbalanced lines, since certain types of coupling to be described are possible in the balanced case, which are impossible in the unbalanced case.

In one of its most important aspects, this invention relates to the use of such directional coupling devices in an antenna multiplex system wherein a multiplicity of signal utilizing devices such as television receivers are to be supplied from a common antenna with a minimum of interaction.

The problem of providing television antennas for use in apartment houses has become a vexing one. For many reasons, it is desirable to operate a plurality of receivers from a single antenna. Considerations of cost, simplicity, efficiency and appearance are among the most significant. Moreover, even if it were otherwise feasible to employ a separate antenna for each receiver, there would still exist the problem of avoiding interaction from local oscillator radiations since coupling would exist between the many antennae. However, when a plurality of receivers is supplied from a single antenna by coupling to a common transmission line, there arises a serious problem of interference between the various receivers, resulting both from local oscillator radiation which is fed back through the common line and gives rise to spurious signals and from reflections from improperly terminated branch paths. One solution has been the use of attenuation pads in the branch paths to provide the necessary isolation. However, this technique has the considerable disadvantage of consuming excessive power in these attenuation pads.

Ordinarily, in cities where larger apartments are common, there will be sufficient power received in a single antenna to supply a large number of receivers. However, if it is necessary to introduce considerable loss between the antenna and each receiver to isolate the various receivers in order to avoid the undesirable interaction described, the feasibility of using a single antenna without associated amplification soon disappears. There is need for a simple non-dissipative coupling arrangement to provide the desired isolation.

The use of directional couplers for coupling a plurality of receivers to a common transmission line which is supplied from a single antenna is a convenient solution for providing the desired isolation.

Accordingly, another object is to provide directional couplers suitable for use in the frequency range of home television receivers.

The invention will be better understood by reference to the following more detailed description taken in connection with the accompanying drawings forming a part thereof, in which.

Figure 1:
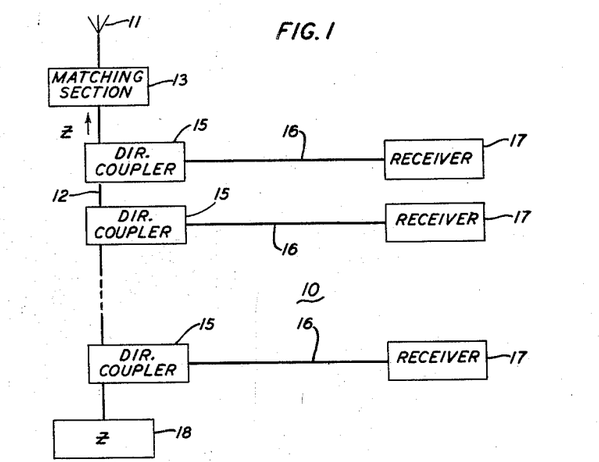
Fig. 1 shows, in block schematic form, an antenna multiplexing system which employs directional couplers.

With reference more particularly to the drawings, Fig. 1 illustrates, in block schematic form, a system 10 wherein a plurality of receivers is connected to a transmission line from a single antenna by means of directional couplers. An antenna 11 which, for example, can be a television antenna, is coupled to the transmission line 12 through the coupling means 13, in a manner well known to the art, so that the line 12 sees an impedance match Z in looking into the coupling means 13. Such means can comprise a matching pad of the kind well known in the art or can comprise an amplifier to provide additional power to compensate for the diminution introduced by the isolation devices in supplying the plurality of receivers. At the far end also, the line 12 is terminated in its characteristic impedance Z by member 18. As a result, signals from the antenna 11 will pass down the line 12 and be dissipated in the termination 18 without reflection. Directional couplers 15 are coupled to the line 12 at intervals to supply the various branch paths 16 which feed the separate signal utilizing receiver units 17. The forward direction of the coupling is arranged to be from the antenna end of the main line 12 to the receiver unit 17 in each of the branch paths. By way of illustration, it will be assumed that the coupling is such as to provide a forward loss of 20 decibels and a backward loss of 60 decibels. For these values, 1 percent of the signal energy developed in the antenna will be delivered to each branch path. Suppose that one of such branch paths is completely misterminated so that the wave therein is reflected back through its associated directional coupler to the main line. Since the branch path is terminated in the coupler, this reflection will produce in the main line a wave 40 decibels down on the original signal but directed towards the antenna end where it will be dissipated in the matched coupling means 13. Therefore, even in this extreme case, substantially only a single wave which is 40 decibels down from the original signal can be reflected from the branch path back into the main line. Moreover, since this will be directed in the backward direction, significantly none will be fed back to the other branch paths.

Similarly, in each branch path, spurious radiation introduced by the local oscillator of the corresponding receiver will encounter the forward loss of one coupler and the backward loss of another before reaching any other receiver, whereas the useful signals being supplied from the antenna 11 encounter only the forward loss of one coupler before reaching any receiver. By providing for gain in the coupling means 13, this forward loss can be compensated. It is evident, therefore, that the relative discrimination or selectivity of such an arrangement is at least the backward loss of one coupler. Since this can conveniently be made quite high, in particular by the directional couplers to be described hereinbelow, adequate isolation is provided. It can be appreciated that by the use of directional couplers, there can be provided an isolating attenuation of 80 decibels between the various receivers in the branch paths at the expense of only 20 decibels reduction in level from that received by the antenna whereas, to secure equivalent isolation by the insertion of attenuation pads between the common line and the receivers, an attenuation of 40 decibels is necessary.

Figure 2A:
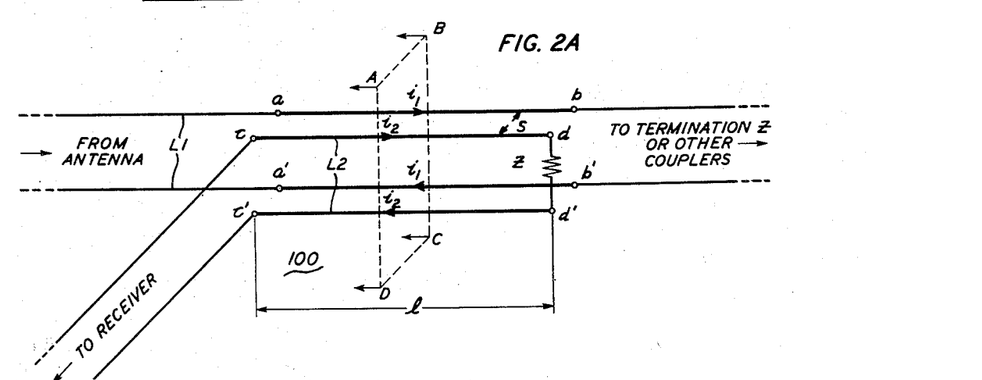
Figs. 2A and 2B and Figs. 3A and 3B are schematic diagrams which will be referred to in developing the principles of directional coupling.
Figure 2B:
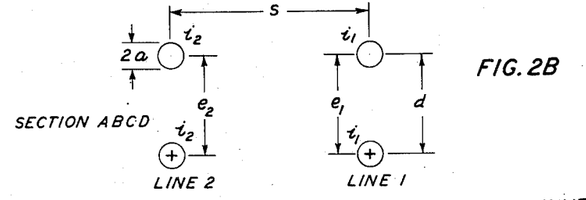

The principles of directional coupling will be described with reference to Figs. 2A and 2B which are, respectively, a perspective view in schematic form of a directional coupler 100 and a cross section of this coupler. For simplicity and expediency, there will be described only cases for which balanced modes prevail, i. e. where the currents and potentials of each line are equal and opposite. This implies not only balanced excitation and termination, but also symmetrical coupling between the lines. Departures from strict symmetry, inevitable in any physical embodiment, will not seriously affect the results based on an ideal structure. Additionally, it will be assumed that the two lines are of equal impedance. Little will be lost by this assumption since the various expressions may be modified to the case of unequal impedances merely by multiplying these expressions by appropriate impedance ratios. A balanced two-wire transmission line L1 having a separation $d$ between the two conductors thereof (each of radius $a$) is electromagnetically coupled over the length $l$ to a second similar two-wire transmission line L2.

If:

$x$=distance along either line ($x=0$ at terminals $a$, $a'$, $c$, $c'$; $x=l$ at terminals $b$, $b'$, $d$, $d'$)
$e_1$=voltage between conductors of line L1
$e_2$=voltage between conductors of line L2
$i_1$=current in conductors of line L1
$i_2$=current in conductors of line L2 then the following differential equations hold:

$$\frac{\partial e_1}{\partial x}=-L\frac{\partial i_1}{\partial t}-L_M\frac{\partial i_2}{\partial t}=-L\left(\frac{\partial i_1}{\partial t}+\lambda\frac{\partial i_2}{\partial t}\right) \quad (1)$$

$$\frac{\partial i_1}{\partial x}=-C\frac{\partial e_1}{\partial t}-C_M\frac{\partial e_2}{\partial t}=-C\left(\frac{\partial e_1}{\partial t}+\gamma\frac{\partial e_2}{\partial t}\right) \quad (2)$$

$$\frac{\partial e_2}{\partial x}=-L\frac{\partial i_2}{\partial t}-L_M\frac{\partial i_1}{\partial t}=-L\left(\frac{\partial i_2}{\partial t}+\lambda\frac{\partial i_1}{\partial t}\right) \quad (3)$$

$$\frac{\partial i_2}{\partial x}=-C\frac{\partial e_2}{\partial t}-C_M\frac{\partial e_1}{\partial t}=-C\left(\frac{\partial e_2}{\partial t}+\gamma\frac{\partial e_1}{\partial t}\right) \quad (4)$$

where $$\lambda=\frac{L_M}{L} \quad \gamma=\frac{C_M}{C}$$

and from geometrical considerations $$L=\frac{\mu}{\pi}\log\frac{d}{a} \quad (5)$$

$$L_M=\frac{\mu}{\pi}\log\sqrt{1+\frac{d^2}{s^2}} \quad (6)$$

$$C=\pi\epsilon\frac{\log\frac{d}{a}}{\log^2\frac{d}{a}-\log^2\sqrt{1+\frac{d^2}{s^2}}}=\frac{C_0}{1-k^2} \quad (7)$$

$$C_M=\pi\epsilon\frac{\log\sqrt{1+\frac{d^2}{s^2}}}{\log^2\frac{d}{a}-\log^2\sqrt{1+\frac{d^2}{s^2}}}=\frac{kC_0}{1-k^2} \quad (8)$$

where $$k=\frac{\log\sqrt{1+\frac{d^2}{s^2}}}{\log\frac{d}{a}}$$

and $$C_0=\frac{\pi\epsilon}{\log\frac{d}{a}}$$

Thus $$\frac{L_M}{L}=\lambda=k$$

$$\frac{C_M}{C}=\gamma=-k$$

If the terminals $bb'$ and terminals $cc'$ face an impedance $Z$, where $$Z=\sqrt{\frac{L}{C}}$$

and if a voltage $E^{i\omega t}$ (real part) is applied to the terminals $aa'$, then by solution of the above differential equations, it can be shown that the current and voltage in lines L1 and L2 are given by:

$$e_1=E\frac{\sqrt{1-k^2}\cos\beta(l-x)+i\sin\beta(l-x)}{\sqrt{1-k^2}\cos\beta l+i\sin\beta l}e^{i\omega t} \quad (9)$$

$$i_1=\frac{e_2}{Z} \quad (10)$$

$$e_2=ikE\frac{\sin\beta(l-x)}{\sqrt{1-k^2}\cos\beta l+i\sin\beta l}e^{i\omega t} \quad (11)$$

$$i_2=-\frac{e_2}{Z} \quad (12)$$

where $$\beta=\omega\sqrt{LC(1-k^2)}=\omega\sqrt{\mu\epsilon}=\frac{\omega}{c}$$

$\omega$ = angular frequency
$c$ = velocity of light
$\mu$ = permeability of medium
$\epsilon$ = dielectric constant of medium } MKS units.

From the above equations, it is evident that the coupling action is directional (in particular, it is counter-directional since the induced wave travels in the opposite direction to the inducing wave) since the voltage and current at terminals $dd'$ ($e_2$ and $i_2$ at $x=l$) are zero regardless of $l$ or $\omega$. If the signal had been applied at terminals $bb'$, then by symmetry no voltage or current would appear at terminals $cc'$. By superposition, it can be seen further that if an input $E_a$ is applied at terminals $aa'$ and simultaneously at input $E_b$ is applied at terminals $bb'$, then the output at terminals $cc'$ will be in response to $E_a$ only, and at terminals $dd'$ will be in response to $E_b$ only.

The "forward" transmission $A_F$ of the coupler (i. e., the transmission between terminals $aa'$ and $cc'$ or between $bb'$ and $dd'$) is given by the ratio of $e_2$ to $e_1$ at $x=0$, and is $$A_F=ik\frac{\sin\beta l}{\sqrt{1-k^2}\cos\beta l+i\sin\beta l} \quad (13)$$

The maximum value of this expression occurs when $$\beta l=\frac{(2n-1)\pi}{2}$$

i. e., when $l$ is an odd number of quarter wavelengths long and is given by $A_{Fmax}=k$. The coupling factor $k$ thus gives directly the forward transmission of the coupler at the frequencies of maximum output. The minimum forward loss $L_F$ in decibels is simply $L_F=20\log_{10}k$.

It should be emphasized that since no dissipation occurs in the termination $Z$ at terminals $dd'$ and substantially none in the coupler itself, the power supplied at terminals $aa'$ is partitioned without loss to the loads connected to terminals $bb'$ and $cc'$. Furthermore, if the connecting transmission lines have characteristic impedance $Z$ and are properly terminated, the coupler introduces no reflections.

Obviously, if the coupler is not terminated by the impedance $Z$ at terminals $aa'$ and/or $dd'$, then reflections will occur at the mismatched terminals in response to an input at $bb'$. A wave reflected from $aa'$ is equivalent to an input at $aa'$ and will provide an output at $cc'$, while the normal forward response at $dd'$ (to an input at $bb'$) will be reflected to $cc'$. Under these conditions, the backward transmission is no longer zero.

As a practical matter, then, the backward loss is determined by the accuracy of termination which it is feasible to provide. It has been found a relatively simple matter, in a coupler with 20 decibels forward loss, to obtain 50 decibels backward loss. With a little more attention, this figure can be raised to 60 decibels.

If the coupling factor $k$ is small so that the $k^2\ll 1$, negligible reaction occurs into the main line L1 from the induced signal in line L2. The Equations 9 through 12 then simplify to $$\left.\begin{array}{l}e_1\cong Ee^{i(\omega t-\beta x)}\\ i_1\cong\frac{e_1}{Z}\end{array}\right\} \text{A pure traveling wave}$$

$$\left.\begin{array}{l}e_2\cong ikE\sin(l-x)e^{i(\omega t-\beta l)}\\ i_2\cong-\frac{e_2}{Z}\end{array}\right\} \text{A pure standing wave}$$

and the forward transmission becomes simply $$A_F\cong ik\sin\beta le^{-i\beta l} \quad (14)$$

The coupled output thus varies sinusoidally with frequency. If $$\beta l=\frac{\pi}{2} \text{ at } f=f_0$$

then at $$\frac{f_0}{2} \text{ and } \frac{3f_0}{2}, \beta l$$

will equal $$\frac{\pi}{4} \text{ and } \frac{3\pi}{4}$$

and $\sin\beta l$ will be $$\frac{1}{\sqrt{2}}$$

The output is thus flat to within 3 decibels over a three-to-one frequency band. However, for some applications, it is desirable to operate over a broader band and to provide more uniform transmission over the operating band. Therefore, means in accordance with the present invention for increasing the ratio of lowest-to-highest frequency covered and for improving the uniformity of transmission within the augmented band thus covered are described hereinbelow.

Figure 3A:
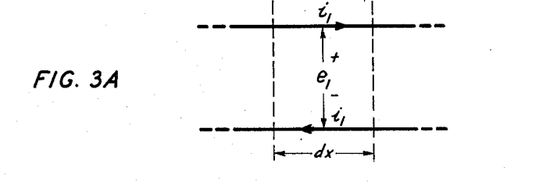
Figure 3B:
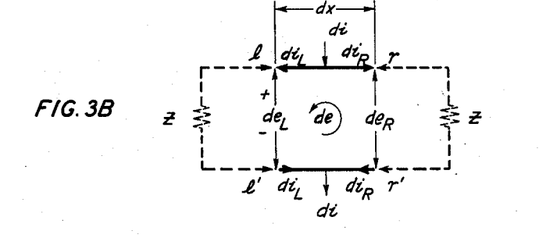

While the foregoing is an accurate description of the action of a particular directional coupler, the equations, as presented, give little insight into the reasons for the directional action. A better understanding may be had from the following heuristic approach:

Fig. 3A shows an element of length $dx$ in the main line L1 of the coupler, while Fig. 3B shows (displaced) the adjacent element of length $dx$ of the branch line L2. The voltage $e_1$ and current $i_1$, as shown in Fig. 3A, are of the proper relative sense for a wave traveling to the right. The element of Fig. 3B is terminated on the left and right by the rest of the branch line, i. e., by impedance $Z$. Furthermore, $$\frac{e_1}{i_1}=Z=\sqrt{\frac{L}{C}}$$

A voltage $de$ will be induced in the branch line element $dx$, given by $$de=L_M\frac{di_1}{dt}dx=kL\frac{di_1}{dt}dx=\frac{kL}{Z}\frac{de_1}{dt}dx=k\sqrt{LC}\frac{de_1}{dt}dx$$

Half of this voltage will appear at terminals $ll'$, half at $rr'$. The voltage $de$ will circulate a current $$\frac{de}{2Z}=\frac{kL}{2Z}\frac{di_1}{dt}dx=\frac{1}{2}k\sqrt{LC}\frac{di_1}{dt}dx\left(=\frac{di}{2}\right)$$

A displacement current $di$ will be introduced in the section $dx$, where $$di = -C_M \frac{de_1}{dt} dx = kC \frac{de_1}{dt} dx = kCZ \frac{di_1}{dt} dx = k\sqrt{LC} \frac{di_1}{dt} dx$$

Half of this current will flow to the left, half to the right. The current $di$ will produce a voltage between conductors of the line L2.

$$\frac{Z}{2} di = \frac{kZC}{2} \frac{de_1}{dt} dx = \frac{1}{2} k \sqrt{LC} \frac{de_1}{dt} dx \left(= \frac{de}{2}\right) \quad 10$$

Adding component voltages and currents, we find at $ll'$ $$de_l = \frac{de}{2} + \frac{Z}{2} di = \frac{de}{2} + \frac{de}{2} = de = k\sqrt{LC} \frac{de_1}{dt} dx \quad (15)$$

$$di_l = -\frac{di}{2} - \frac{de}{2Z} = -\frac{di}{2} - \frac{di}{2} = -di = -k\sqrt{LC} \frac{di_1}{dt} dx \quad (16)$$

while at $rr'$ $$de_r = -\frac{de}{2} + \frac{Z}{2} di = -\frac{de}{2} + \frac{de}{2} = 0$$

$$di_r = \frac{di}{2} - \frac{de}{2Z} = \frac{di}{2} - \frac{di}{2} = 0$$

Thus, all the voltage and current induced in the element $dx$ appear at the left of the element, and the relative sense is that for a wave traveling to the left. It can thus be concluded that the induction is such as to launch only a counter-traveling wave in the branch line L2 and that the coupling is counter-directional.

The counter-directional coupling arises from the fact that the induced voltage and current resulting from magnetic coupling are equal in magnitude to the induced voltage and current resulting from electric coupling, but so directed as to add to the left and cancel to the right. It can be seen that the coupling can be made non-directional by eliminating either the magnetic or electric coupling and that the counter-directional action can be reversed and made co-directional by reversing either the magnetic or electric coupling.

Figure 4:
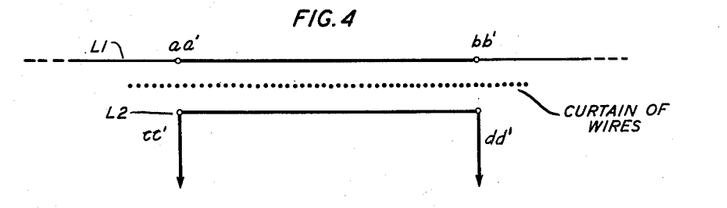
Figs. 4, 5 and 6 are illustrative arrangements for directional coupling in accordance with specific embodiments of the invention.

In Fig. 4, there is shown an exemplary embodiment of a coupling arrangement wherein the electric coupling has substantially been eliminated. In this embodiment, the electric coupling has been removed by interposing between the two coupled lines L1 and L2, a curtain of closely spaced mutually insulated wires. With such an arrangement, a signal applied to line L1 at terminals $aa'$ will produce outputs at both terminals $cc'$ and $dd'$ of line L2. However, it can be shown that unless the coupling is small so that $k^2 \ll 1$, the input impedance of the coupler will vary with frequency so it is impractical to match the transmission line exactly over a broad frequency band. This is not the case with a purely directive coupler.

Figure 5:
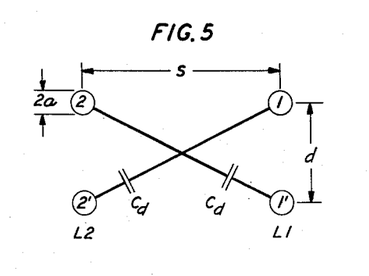

With balanced two-wire lines, as have been described above, the electric coupling can be reversed by the expedient of adding access capacity in the form of capacitors across the diagonals of the array, as shown in the arrangement which is shown in cross section in Fig. 5. Here the two lines L1 and L2, comprising the conductors 1 and 1', and 2 and 2', respectively, are coupled additionally by means of the capacitors $C_d$. Normally (with $C_d = 0$), the direct capacity between conductors 2 and 1 is greater than between conductors 2 and 1'. If the value of $C_d$ is large enough, the reverse is the case, and the electric coupling is reversed. It is not necessary that the added capacity be continuously distributed, but the spacing between capacitors should be small compared with a quarter wavelength.

The critical value of $C_d$ to provide complete directional coupling can readily be computed. It can be seen that the coupling is counter-directional if $\gamma = -\lambda$, non-directional if $\gamma = 0$, and co-directional if $\gamma = \lambda$. Referring to Equations 7 and 8, it can be seen that for the exemplary embodiment shown in Fig. 5;

$$C = \frac{C_d}{2} + \frac{C_0}{1 - k^2}$$

$$C_M = \frac{C_d}{2} - \frac{C_0}{1 - k^2}$$

For $$\gamma = \frac{C_M}{C} = k$$

requires that:

$$C_d = \frac{4k}{1-k} \left(\frac{C_0}{1-k^2}\right)$$

If this is the case, then for the same conditions of excitation as before (voltage E applied to terminals $aa'$, and the terminals $bb'$, $cc'$, and $dd'$ terminated), the solution of Equations 1 to 4 yields $$e_1 = E \cos k\beta x e^{i(\omega t - \beta x)} \quad (17)$$

$$i_1 = \frac{e_1}{Z} \quad (18)$$

$$e_2 = -iE \sin k\beta x e^{i(\omega t - \beta x)} \quad (19)$$

$$i_2 = \frac{e_2}{Z} \quad (20)$$

$$F_c = \frac{e_2|x=l}{e_1|x=0} = -i \sin k\beta l e^{-i\beta l} \quad (21)$$

where $$Z = \sqrt{\frac{L}{C}} \text{ and } \beta = \sqrt{LC}$$

Since the voltage and current at terminals $cc'$ ($e_2$ and $i_2$ for $x = 0$) are zero, the coupling is co-directional. The voltages and currents at any point $x$ are independent of the length $l$ of the coupler. As $x$ increases from zero, the voltage and current in line L2 build up sinusoidally at the expense of the voltage and current in line L1 till at $$k\beta x = \frac{\pi}{2}$$

$e_1$ and $i_1$ are zero, and all the power is in the coupled line L2. For larger values of $x$, the reverse action occurs till at $k\beta x = \pi$, all the power is back in line L1.

Figure 7A:
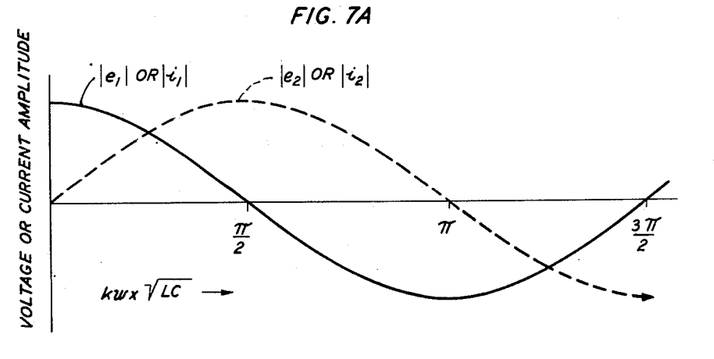
Figs. 7A and 7B are graphical representations to help in understanding the description of the invention.
Figure 7B:
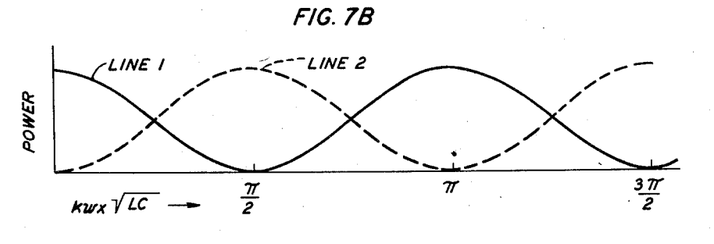

Fig. 7A illustrates the way the voltage and current amplitudes vary with distance, or (for $x = l$) with frequency. Fig. 7B illustrates the way the corresponding powers vary.

Figure 8A:
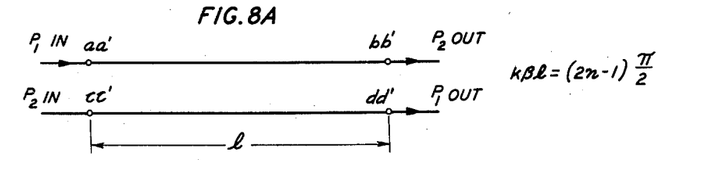
Figs. 8A and 8B are schematic diagrams referred to in the development of the principles of the invention.
Figure 8B:
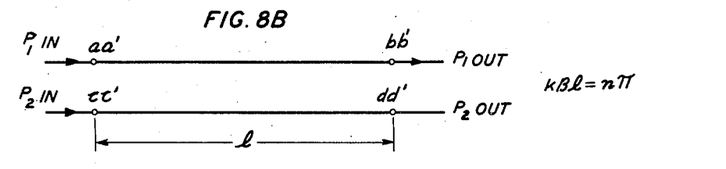

If $$k\beta l = (2n - 1) \frac{\pi}{2}$$

a signal of power P1 introduced at terminals $aa'$ appears unattenuated at terminals $dd'$, while one introduced at terminals $cc'$ appears at terminals $bb'$. This condition, shown in Fig. 8A, is as if the two lines had been interchanged. On the other hand, if $k\beta l = n\pi$, the two signals are back in their respective starting lines, as shown in Fig. 8B, and the effect is as if no coupling action had occurred. A co-directional coupler of this nature can therefore be used to commute two circuits periodically with frequency.

Figure 6:
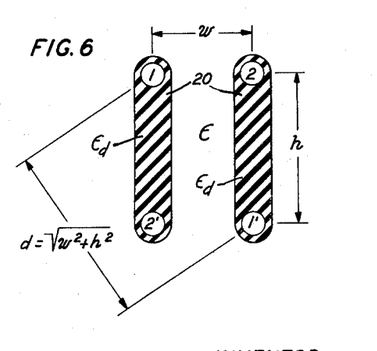

Fig. 6 shows in cross section an alternative arrangement in accordance with the invention for introducing the excess capacity required to produce a co-directional coupler of the kind just described. Here, the two conductors 1' and 2' of the four conductors 1, 1', 2 and 2' of the lines L1 and L2 are interchanged so that in cross section the two conductors for each line lie on the diagonally opposite corners of a rectangle rather than on the adjacent corners. This rectangle is of dimensions $w$ and $h$, where $w$ is the separation between conductors 1 and 2, and 2' and 1', and $h$ is the separation between conductors 1 and 2', and 2 and 1'. The conductors 1 and 2' and 2 and 1' are capacitively coupled to one another by being enveloped by dielectric means having a dielectric constant $e_d$. This structure can be used to produce any type of coupling as follows:

If $\epsilon_d = \epsilon$ (dielectric omitted) and $w \neq h$, the coupling is counter-directional with $$k = \frac{\ln\frac{h}{w}}{\ln\frac{d}{a}}$$

If $\epsilon_d = \epsilon$ (dielectric omitted) and $w = h$, no coupling exists ($k = 0$);

If $\epsilon_d > \epsilon$ (dielectric present) and $w = h$, the coupling is non-directional, since there is only electric coupling present ($\lambda = 0$);

If $\epsilon_d > \epsilon$ (dielectric present) and $w > h$, the coupling is bi-directional, with the counter-directed transmission greater than the co-directed transmission; and If $\epsilon_d > \epsilon$ (dielectric present) and $w < h$, the coupling is in general bi-directional with more co-directed transmission than counter-directed. For one particular value of $$\frac{h}{w}$$

(depending on $$\frac{\epsilon_d}{\epsilon}$$

and the amount of dielectric used), the counter-directed transmission vanishes, and the coupler is co-directional.

It is characteristic of directional couplers that, for small values of $k$ (so that $k^2 \ll 1$), the coupling can be varied as a function of $x$, without affecting the characteristic impedance appreciably and, therefore, without introducing serious reflections.

In the co-directional coupler, an increase or decrease in coupling simply produces an increase or decrease in the rate of transfer of energy with distance, and the conditions at any point on the line depend only on the integral of $k$ with respect to $x$ up to the point in question. Accordingly, if $k$ is always small (so that $\beta$ and $Z$ are approximately constant), Equation 21 becomes $$F_C \simeq -i \sin\left[\beta \int_0^l k(x)\,dx\right] e^{-i\beta l}$$

The transmission is substantially the same as that of a coupler with constant coupling $$k_0 = \frac{1}{l}\int_0^l k(x)\,dx$$

The transmission will still vary sinusoidally with frequency.

In the counter-directional coupler, with small $k$, the output may be thought of as the vector sum of the outputs due to each elementary length $dx$:

$$de_2|_{x=0} = k(x)\sqrt{LC}\left(\frac{de_1}{dt}\right)_{|x=x} e^{-i\beta x} \simeq ik(x)\omega\sqrt{LC}(e_1)_{|x=0} e^{-i2\beta x}$$

so that $$A_F = \frac{e_2}{e_1|_{x=0}} \simeq i\omega\sqrt{LC}\int_0^l k(x) e^{-i2\beta x}\,dx$$

and since $k^2 \ll 1$, $$A_F = i\beta\int_0^l k(x) e^{-i2\beta x}\,dx = i\beta \int_{-\infty}^{\infty} k(x) e^{-i2\beta x}\,dx \quad (22)$$

since $k = 0$ outside the limits 0 and $l$.

The integral in Equation 22 is a Fourier transform in which $x$ is the old coordinate, $2\beta$ the new. Thus, if $K(\omega)$ is the Fourier transform of $k(t)$, then $$A_F = i\beta K(2\beta)$$

For constant coupling over the length $l$, ($k = k$, for $0 < x < l$, $k = 0$ elsewhere), $$K(2\beta) = k\frac{1 - e^{i2\beta l}}{i2\beta} = \frac{k}{\beta}\sin\beta l\, e^{-i\beta l}$$

and $$A_F = ik \sin\beta l\, e^{-i\beta l}$$

which corresponds to Equation 14.

Equation 22 is not limited to the case of constant coupling over a length $l$. Any coupling distribution $k(x)$ may be used and Equation 22 will apply provided that $|A_F|^2$, as determined by Equation 22, is small compared to unity, and provided that $k^2 \ll 1$ everywhere. These restrictions apply since equation 22 was derived under the assumption that the induced waves in the auxiliary line have negligible reaction on the inducing waves in the main line.

If $v$ is the velocity of propagation and $t$ is the round trip propagation time between $x = 0$ and $x = x$, then $$\beta = \frac{\omega}{v}$$

$$x = \frac{vt}{2}$$

and Equation 22 may be rewritten as $$F(\omega)\frac{i\omega}{2}\int_{-\infty}^{\infty} k\left(\frac{vt}{2}\right) e^{-i\omega t}\,dt \quad (24)$$

$F(\omega)$ is thus $$\frac{i\omega}{2}$$

times the Fourier transform of $$k\frac{(vt)}{2}.$$

If $g(t)$ is the response of the coupler to a step function, then $$g(t) = \frac{1}{2\Pi}\int \frac{F(\omega)}{i\omega} e^{i\omega t}\,d\omega \quad (25)$$

$$g(t) = \frac{1}{2}k\left(\frac{vt}{2}\right) \quad (26)$$

Thus the step function response is one-half the coupling function with $$\frac{vt}{2}$$

substituted for $x$. Conversely, $$k(x) = 2g\left(\frac{2x}{v}\right) \quad (27)$$

The impulse response, $f(t)$, of the coupler is the time derivative of the step response, so that $$f(t) = g'(t)\frac{1}{2}k'\left(\frac{vt}{2}\right) \quad (28)$$

$$f(t) = \frac{1}{2\Pi}\int_{-\infty}^{\infty} F(\omega) e^{i\omega t}\,d\omega \quad (29)$$

$$F(\omega) = \int_{-\infty}^{\infty} f(t) e^{-i\omega t}\,dt \quad (30)$$

The above equations permit the computation of the coupling function $k(x)$ required to produce any desired frequency characteristic $F(\omega)$; $g(t)$ can be derived from (25) and $k(x)$ is then given by (27).

Figure 9:
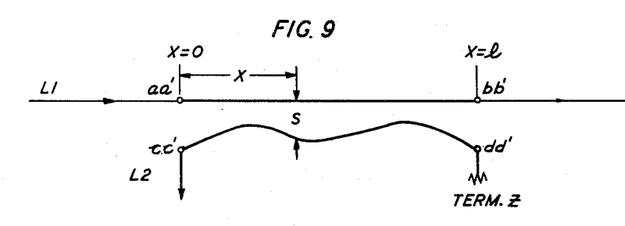
Figs. 9 and 10 are illustrative directional couplers in accordance with specific embodiments of the invention.

A coupler in which the coupling factor $k(x)$ varies with $x$ to provide a desired frequency characteristic $F(\omega)$ is shown schematically in Fig. 9.

However, not all $F(\omega)$'s are realizable. The restrictions on $F(\omega)$ are somewhat similar to those found in filter theory, but with the further restriction that $F(0)$ must be zero. Otherwise $g(t)$ will not vanish at $t \to \infty$, nor $k(x)$ as $x \to \infty$. Obviously, to pass D.-C., the coupler must be infinitely long. Any $F(\omega)$ whose step function response assumes both positive and negative values requires reversal of coupling. This can be done by transposing the conductors of either line at the required values of $x$.

If $F(\omega)$ is the response of any physically realizable network, the required $k(x)$ will be zero for all $x<0$. Certain frequency characteristics are not realizable in filters without added delay. The same is true here, but the delay is easily included. For such a characteristic, $k(x)$ will not be zero for all $x<0$. However, if $k(x)$ is replaced by $k(x-x_0)$ the whole coupling function will be translated to the right. If $x_0$ is chosen so that $k(x-x_0)$ is zero (or vanishingly small) for $x<0$, then the required frequency characteristic can be realized (or closely approximated) with an added delay $$t_0 = \frac{2x_0}{v}$$

Figure 11:
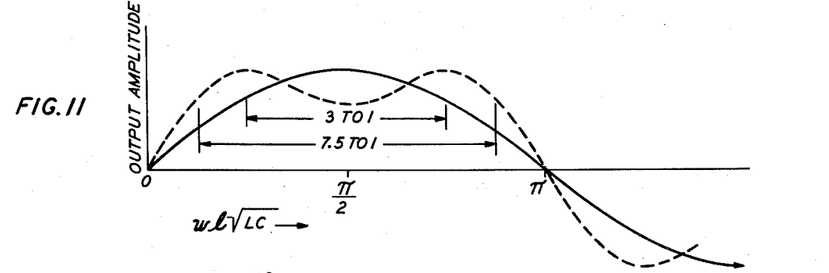
Fig. 11 is a graphical representation illustrating the advantages of one aspect of the invention.

A structure providing relatively flat transmission over a wide frequency band may be synthesized without resorting to the Fourier transform method outlined above. From Equation 14 it can be seen that a coupler with constant coupling provides maximum output at the frequency $f_0$ for which $\sin \beta l = 1$. At $$\frac{f_0}{2} \text{ and at } \frac{3f_0}{2}, \sin \beta l = \frac{1}{\sqrt{2}}$$

so that the response is flat within 3 decibels over a 3 to 1 band, as shown by the solid curve in Fig. 11.

Suppose now two couplers are used, one of length $l$ and coupling $k_1$, the other of length $3l$ and coupling $k_3$, both with their input and output terminals at $x=0$. The forward transmission of the first is $$A_1 = ik_1 \sin \beta l e^{-i\beta l}$$

and of the second $$A_3 = ik_3 \sin 3\beta l e^{-i3\beta l}$$

Let the first coupler now be displaced so that its input and output terminals are at $x=l$ (other end at $x=2l$) and let these terminals be connected by two transmission lines back to the plane $x=0$. The output, $A_1$, measured at $x=0$, will be the same as before but delayed by the propagation time over the transmission lines to $x=l$ and back. For this case, the transmission will be $$A'_1 = ik_1 \sin l e^{-i3\beta l}$$

If $A'_1$ and $A_3$ are added, we get $$A = A'_1 + A_3 = i(k_1 \sin \beta l + k_3 \sin 3\beta l) e^{-i3\beta l}$$

Figure 10:
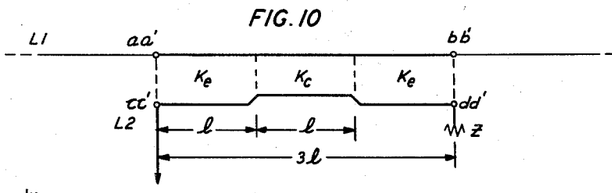

This same result can be obtained in a single coupler, as shown in Fig. 10, in which $k_e = k_1$ and $k_c = k_1 + k_3$. The addition assumed above then occurs by superposition in the single coupler. If $$k_3 = \frac{k_1}{3}$$

the transmission will be as shown by the dotted curve of Fig. 11 and will be flat to within 3 decibels over a 7.5 to 1 band.

Obviously the above may be generalized to attain, in a coupler of length $nl$, in accordance with the invention, the transmission:

$$A = i(k_1 \sin \beta l + k_3 \sin 3\beta l + k_5 \sin 5\beta l + \ldots k_n \sin n\beta l)$$
$$e^{-in\beta l}$$

If the coefficients $k_j$ are made those of the Fourier series for a square wave, say i. e., if $$k_j = \frac{k_1}{j}$$

the transmission can be made substantially flat over a very wide band.

The coefficients of the various terms need not be those of the Fourier series for a square wave. Instead, they may be chosen to give maximally flat response over the band.

Figure 12:
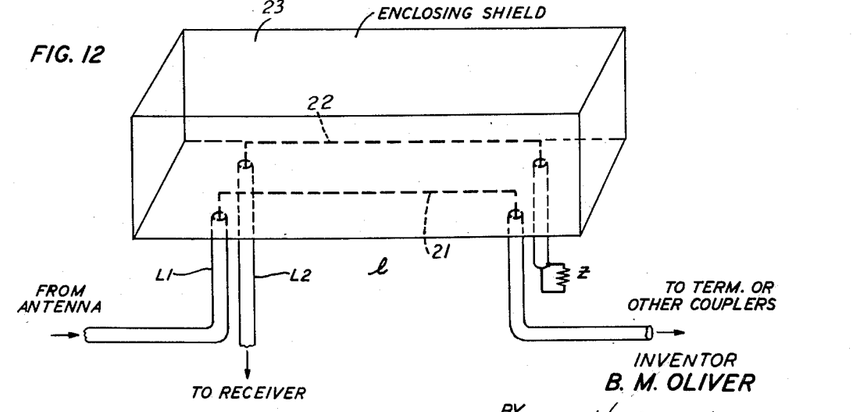
Fig. 12 is an illustrative arrangement of directional coupling of coaxial transmission lines.

Counter-directional and bi-directional couplers may be made using unbalanced transmission lines such as coaxials in accordance with the above-described principles. However, since it is generally not possible to reverse either the electric or magnetic coupling in an unbalanced structure, barring materials having negative dielectric constants or permeabilities, codirectional coupling in which the induced wave travels in the same direction as the inducing wave, cannot be achieved conveniently with unbalanced lines. Fig. 12 shows a typical arrangement for incorporating these principles for application with a coaxial line. The coupling comprises a section of length $l$ of the inner conductors 21 and 22 of the two coaxial lines L1 and L2, respectively, which are enclosed within a shield 23 connected to the outer conductors of the coaxial lines L1 and L2. The same principles of broadbanding by varying the coupling, as discussed hereinabove, are also applicable here.

Figure 13:
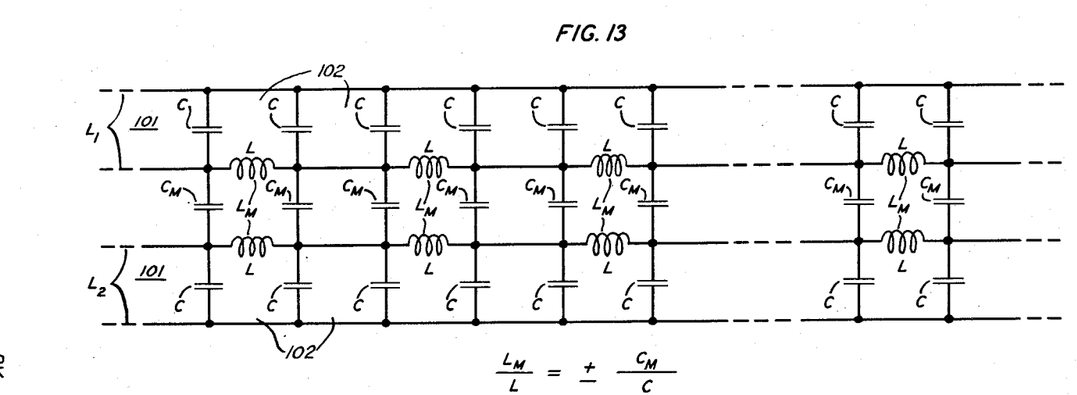
Fig. 13 illustrates an arrangement which utilizes artificial transmission lines for directional coupling at lower frequencies.

Moreover, at lower frequencies where couplers using smooth lines become too long to be practical directional coupling can be achieved by the use of artificial transmission line sections made up of lumped capacitances and inductances. Such an arrangement is illustrated in Fig. 13. There is inserted individually in both the main line L1 and the auxiliary line L2, which, for example, can be telephone lines, a ladder-type network 101 made up of a plurality of sections 102 each of which comprises a series inductance L between two shunting capacitances C. The two networks inserted are disposed with one another so that there is established a mutual inductance $L_M$ between the series inductances of corresponding sections in the two networks. Additionally corresponding sections of the two networks are coupled by means of shunting capacitances $C_M$ inserted between corresponding series inductances. From the principles set forth above, it can be shown that inherently directional coupling will be realized, for example, if $$\frac{L_M}{L} = \pm \frac{C_M}{C}$$

In this lumped impedance case, the magnetic coupling is easily reversed by changing the winding sense of the coils in one line. Both codirectional and counterdirectional couplers are thus possible in unbalanced lumped lines.

It can therefore be appreciated that many varied arrangements for directional coupling are possible consistent with the principles described, and so it is therefore to be understood that the arrangements set forth are merely illustrative of these principles. Other arrangements can be devised without departing from the spirit and scope of the invention.

What is claimed is:

1. In a directional coupler, first and second balanced transmission lines, each having a pair of parallel wires, the two lines being electromagnetically coupled along a coupling section in which in cross section the two wires of each line lie on diagonal vertices of a quadrilateral having a pair of substantially parallel sides, and dielectric means having a constant greater than unity distributed along said coupling section, two opposite sides of the quadrilateral being separately enclosed by said dielectric means.

2. In a directional coupler, a parallel two wire main transmission line, a parallel two wire auxiliary transmission line coupled to said main line along a coupling section, the two lines being disposed so that along the coupling section in cross section the two wires of each line lie on diagonal vertices of a parallelogram, and dielectric means having a constant greater than unity along said coupling section, two opposite sides of said parallelogram being separately enclosed by said dielectric means.

3. A directional coupling arrangement comprising a first two wire transmission line, a source of a signal wave at one end of said line, a characteristic impedance termination at the other end of said line, a second two wire line having a portion disposed in electromagnetic field coupling relation with respect to a portion of said first line, a load for utilizing the signal wave at one end of said second line, a characteristic impedance termination at the other end of said second line, and capacitive means having a dielectric constant greater than unity distributed along the coupled portions and inserted across pairs of wires formed by single wires from each of said two transmission lines for reversing the electric coupling between the two lines.

4. A coupling arrangement according to claim 3 in which said lines are disposed with respect to each other along said coupling section so that in cross section each of the wires of said lines lie in respective corners of a quadrilateral having a substantially parallel pair of opposite sides, said wires of each of said lines lying in adjacent corners.

5. A coupling arrangement according to claim 4 in which said pairs of wires formed by single wires from each of said two transmission lines comprise said wires lying in diagonally opposite corners of said quadrilateral.

6. A coupling arrangement as in claim 3 in which the coupled portion of each line is at least a quarter of the operating wavelength long.

7. A coupling arrangement according to claim 6 in which said lines are disposed with respect to each other along said coupling section so that in cross section each of the wires of said lines lie in respective corners of a quadrilateral having a substantially parallel pair of opposite sides, said wires of each of said lines lying in adjacent corners.

8. A coupling arrangement according to claim 7 in which said pairs of wires formed by single wires from each of said two transmission lines comprise said wires lying in diagonally opposite corners of said quadrilateral.

9. A directional coupling arrangement comprising a first two wire transmission line, a signal source at one end of said line, means for terminating the other end of said line in its characteristic impedance, a second two wire transmission line having a portion at least a quarter of the operating wavelength long disposed parallel to the first line in field coupling relation therewith, signal utilization means at one end of said second line, means for terminating the second line in its characteristic impedance, and capacitive means having a dielectric constant greater than unity distributed along the coupled portions of the two lines and inserted across pairs of wires formed by single wires from each of said two lines for reversing the electric coupling between the two lines.

10. In a directional coupling arrangement, a first two wire transmission line, a signal source at one end of said line, means terminating the other end of said line in its characteristic impedance, a second two wire transmission line, a signal load at one end of said line, means terminating the other end of said line in its characteristic impedance, the two transmission lines being positioned to be in coupling relation along a portion of each, in which portion in cross-section the two wires of each line lie on diagonal vertices of a quadrilateral, and dielectric means having a constant greater than unity for enclosing separately the pairs of wires which form two opposite sides of the quadrilateral.

11. The directional coupling arrangement of claim 10 in which along the coupled portion in cross-section the quadrilateral formed by the wires is a parallelogram.

12. The directional coupling arrangement of claim 10 in which along the coupled portion in cross-section the quadrilateral formed is a rectangle.

References Cited in the file of this patent

UNITED STATES PATENTS

| 1,853,181 | Schumard | Apr. 12, 1932 |
| 2,159,648 | Alford | May 23, 1939 |
| 2,523,173 | Winters | Sept. 19, 1950 |
| 2,527,979 | Woodward | Oct. 31, 1950 |
| 2,560,806 | Lewis | July 17, 1951 |
| 2,575,571 | Wheeler | Nov. 20, 1951 |
| 2,606,974 | Wheeler | Aug. 12, 1952 |

OTHER REFERENCES

"Elektrosvyaz," vol. IX, No. 4, April 1941, pages 9–15 (R. T. P. Translation, No. 1525, issued by the Ministry of Aircraft Production), Copy 333/10.